United States Patent
Colens

Patent Number: 5,916,111
Date of Patent: Jun. 29, 1999

[54] SELF CLEANING CUTTING HEAD FOR MOWERS

[75] Inventor: André Colens, Rixensart, Belgium

[73] Assignee: Husqvarna AB, Huskvarna, Sweden

[21] Appl. No.: 08/875,797
[22] PCT Filed: Feb. 9, 1996
[86] PCT No.: PCT/BE96/00012
§ 371 Date: Oct. 23, 1997
§ 102(e) Date: Oct. 23, 1997
[87] PCT Pub. No.: WO96/24242
PCT Pub. Date: Aug. 15, 1996

[30] Foreign Application Priority Data

Feb. 10, 1995 [BE] Belgium .................................. 9500108

[51] Int. Cl.⁶ .......................... A01D 34/78; A01D 34/82
[52] U.S. Cl. .............................. 56/11.9; 56/12.1; 56/17.5; 56/255; 56/DIG. 17
[58] Field of Search .................................. 56/10.2 A, 255, 56/295, 17.5, DIG. 15, DIG. 17, DIG. 20, 12.1, 12.7, 11.9; 30/276

[56] References Cited

U.S. PATENT DOCUMENTS

| 3,500,622 | 3/1970 | Bowen | 56/295 |
| 4,268,964 | 5/1981 | Moore | 56/12.7 X |
| 4,703,613 | 11/1987 | Raymond | 56/12.7 |
| 4,817,372 | 4/1989 | Toda et al. | 56/17.5 X |
| 5,444,965 | 8/1995 | Colens | 56/10.2 A |
| 5,507,137 | 4/1996 | Norris | 56/10.2 A X |
| 5,572,856 | 11/1996 | Ku | 56/10.2 A |

FOREIGN PATENT DOCUMENTS

| 0215416 | 3/1987 | European Pat. Off. . |
| 2537698 | 3/1977 | Germany . |
| 4021496 | 1/1992 | Germany . |

Primary Examiner—Terry Lee Melius
Attorney, Agent, or Firm—Pearne, Gordon, McCoy & Granger LLP

[57] ABSTRACT

The invention relates to a cutting head, more particularly for a lawnmower with a rechargeable battery, comprising an electric motor (1) with a driving shaft (3) connected to a cutting disk (4) perpendicular to said shaft (3). The cutting disk (4) is provided with at least one blade (5) at its periphery. There is also provided a lower plate (7) parallel to and located under said cutting disk (4). The lower plate (7) is free wheeling around the axis though the use of a roller bearing (8). In the case of friction or jamming due to debris, the lower plate (7) starts to rotate to expel the debris by centrifugal effect.

8 Claims, 1 Drawing Sheet

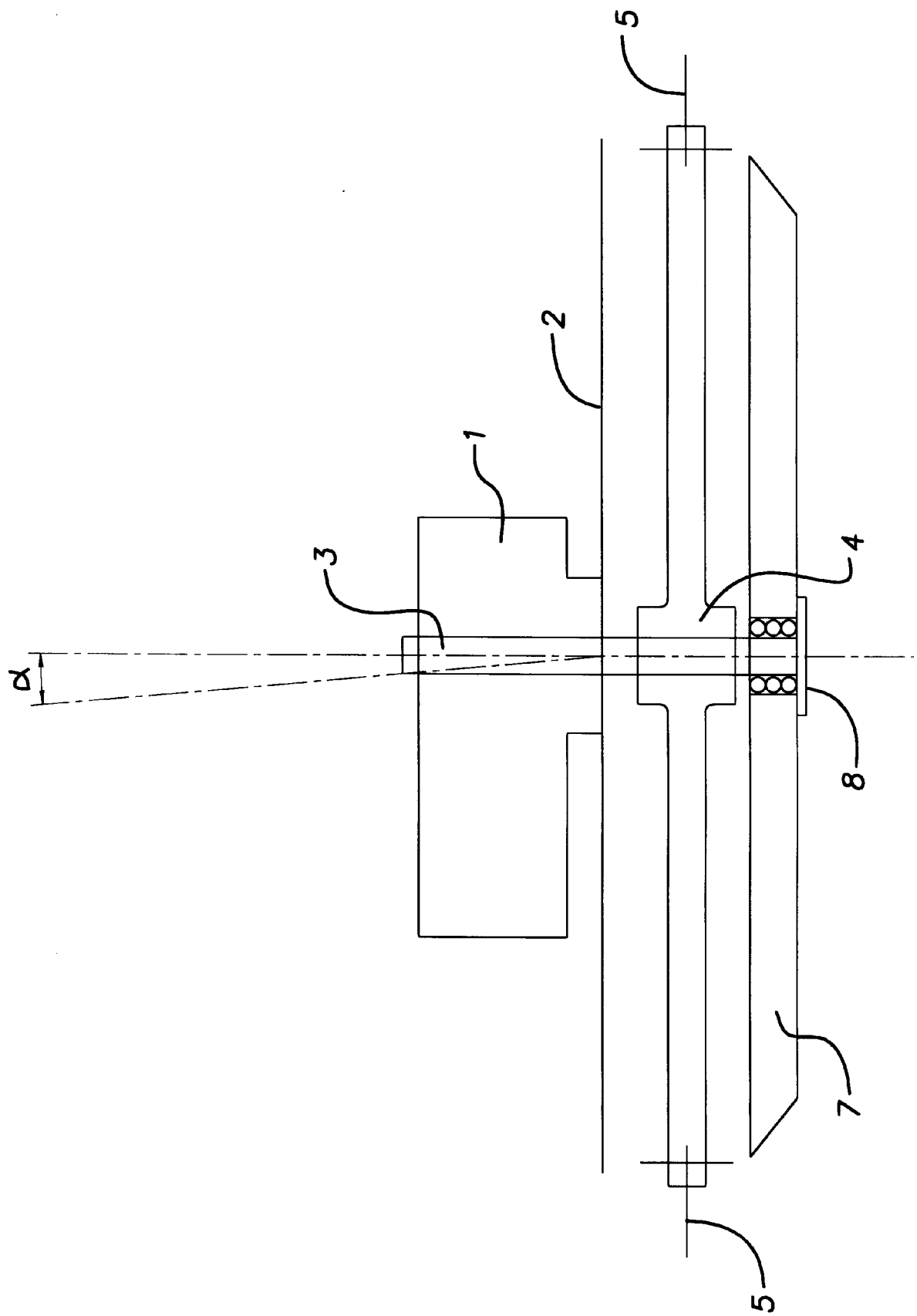

SELF CLEANING CUTTING HEAD FOR MOWERS

BACKGROUND OF THE INVENTION

The present invention relates to a robotic lawn mower, comprising an electric motor, preferably supplied by a rechargeable battery, and being provided with a cutting head having an output shaft which is connected to a cutting disc located perpendicularly to the shaft, said cutting disc comprising at its periphery at least one blade.

Lawnmowers with rechareable batteries are designed in order to run with a minimum power. The cutting device must be adapted to this primary need. It is more particularly the case for mowers which are entirely robotic, with unattended operation, such as the one described in the international patent application PCT/BE91/00068.

Traditional cutting systems perform the cutting operation under a cover, the cut grass being carried along by the rotating system. The ensuing result is that an important part of the energy is wasted during the cutting operation in order to transfer a kinetic energy to the cut grass which is dragged away by the cutting blade.

The cutting head usually used in robotic machines with a rechargeable battery is most often made of a lower plate, essentially circular, assemled to an upper plate by attaching flanges in such a way that a narrow space is left between the two plates.

A cutting disc is located between such plates and fixedly attached to a vertically extending output shaft from an electric motor. The cutting disc comprises preferably at least two retractable blades on its periphery, each of them pivoting around a shaft located on said periphery and capable of returning between said plates.

When the cutting disc starts to rotate, driven by the electric motor, the blades extend due to the centrifugal force and protrude out from both fixed plates in order to perform the grass cutting operation.

The rotating part in contact with the grass is then dramatically reduced and this arrangement decreases substantially the friction on the surface to be mowed, the carrying along or drawing away of the grass by the rotating system and the aerodynamic turbulence.

The use of such lower static plate entails however some problems.

In spite of the centrifugal effect due to the rotating disc, grass debris may on the long run and more particularly in wet weather, adhere to the internal face of the lower plate resulting in a braking effect with concomitant increase of energy consumption.

A low energy consumption is a vital criterion for an efficient performance of an electric lawnmower, more particularly a robotic mower with rechargeable battery.

In particular, for such an autonomous lawnmower with a battery which is rechargeable by induction at a fixed station, it is important that the search for this fixed station according to a predetermined algorithm (such as disclosed in patent application PCT/BE95/00013) be performed with a minimum energy consumption. For this purpose, the rotating cutting disc is disabled and will not operate during the searching step.

The lower plate acts then as a crumb scoop and scrapes the surface to be mowed with ensuing penetration of earth, twigs or dead leave debris between the plates. This may create a problem when the cutting disc has to be restarted.

SUMMARY OF THE INVENTION

The purpose of the present invention is to overcome the above mentioned disadvantages.

According to the invention, there is provided a lawn mower having a cutting head comprising a cutting disc and at least one lower circular plate, preferably of similar dimension, wherein the static lower plate of the prior art is replaced by a mobile plate freely fixed at the end of the rotating shaft of the driving motor, for example by using a rolling bearing such as a ball bearing a sliding bearing or a roller bearing.

The lower plate, in normal operation, which replaces the static lower plate of the prior art, is in contact with the grass of the surface to be mowed and do not rotate, or only slightly.

This construction provides a simultaneous absence of friction between the rotating cutting disc and to decrease the aerodynamic friction.

If debris becomes stuck between the lower plate and the cutting disc, the cutting disc will drag along the lower plate when the rotation starts at the beginning of a grass cutting operation, together with the debris which are then ejected by the rapid rotating movement. The rotating speed (for example 2,500 rotations per minute) is indeed of such an amplitude that no debris will remain between the cutting disc and the lower plate. The cutting head performs therefore as a self cleaning cutting head.

BRIEF DESCRIPTION OF THE DRAWING

The accompanying drawing given by way of example is a view in cross-sectional elevation of a device according to the invention.

DETAILED DESCRIPTION OF THE PREFERRED EMBODIMENT

The device comprises a motor 1 fixed to the chassis (not shown), possibly through an upper supporting plate 2. The motor is equipped with a shaft 3 at the end of which a cutting disc with retractable blades 5 is fixedly mounted.

At the free end of the shaft, a lower circular plate 7 is mounted, which may freely rotate, through the use of a ball bearing 8. The plate 7 is parallel to the cutting disc and separated by a distance of p.e. 5 to 10 mm.

Advantageously, the cutting head may be mounted slightly inclined forward in relation to the direction of movement of the mower such that there is a tilt angle of a few degrees between the spin axis and the perpendicular to the horizontal plane (the plane of the grass to be cut). Preferably the angle is between 4 and 10°, still preferably about 7°. The rear of the plates and cutting disc are therefore upswept and elevated over the mowed surface with no contact with the grass. According to this particular arrangement, the cutting blades will not touch against the grass at the rear of the cutting head, that is to say at a point opposite to the cutting operation, avoiding in this manner an additional energy consumption of poor efficency.

The foregoing is considered as illustrative only of the principles of the invention. Since a numerous modifications and changes will readily occur to those skilled in the art it is not desired to limit the invention to the exact construction and operation shown and described and accordingly, all suitable modifications and equivalents may be resorted to falling within the scope of the invention.

I claim:

1. A lawn mower, comprising an electric motor supplied with electrical energy from a rechargeable battery, and being provided with a cutting head, said electric motor having an output shaft which is connected to a cutting disc located perpendicularly to the shaft, said cutting disc comprising at its periphery at least one blade wherein said cutting head also comprises a lower plate which is parallel with and located under the cutting disc, the lower plate being mounted in a free-rotating arrangement on said shaft by bearing means such that the lower plate normally rotates only slightly or not at all and wherein, in response to debris lodged between said cutting disc and said lower plate, said lower plate is caused to rotate with said cutting disc to centrifugally eject debris introduced between the cutting disc and the lower plate.

2. Lawn mower according to claim 1 wherein the bearing means is a ball bearing.

3. Lawn mower according to claim 1 wherein the peripheral blade or blades are retractable towards the rotation axis.

4. Lawn mower according to claim 1, wherein the rotation axis is inclined forwards relative to the direction of movement of the cutting head mounted in the mower.

5. Lawn mower according to claim 2 wherein the peripheral blade or blades are retractable towards the rotation axis.

6. Lawn mower according to claim 2, wherein the rotation axis is inclined forwards relative to the direction of movement of the cutting head mounted in the mower.

7. Lawn mower according to claim 3, wherein the rotation axis is inclined forwards relative to the direction of movement of the cutting head mounted in the mower.

8. Lawn mower according to claim 5, wherein the rotation axis is inclined forwards relative to the direction of movement of the cutting head mounted in the mower.

* * * * *